Nov. 3, 1931.  E. M. WHITNEY  1,830,079
SEPARABLE CONNECTING DEVICE FOR SLIDE FASTENERS
Filed May 9, 1930

INVENTOR.
Ernest M. Whitney.
BY R. S. Kelley
ATTORNEY.

Patented Nov. 3, 1931

1,830,079

UNITED STATES PATENT OFFICE

ERNEST M. WHITNEY, OF PROVIDENCE, RHODE ISLAND, ASSIGNOR TO HOOKLESS FASTENER COMPANY, A CORPORATION OF PENNSYLVANIA

SEPARABLE CONNECTING DEVICE FOR SLIDE FASTENERS

Application filed May 9, 1930. Serial No. 451,027.

My invention relates to slide fasteners and particularly to an end connecting device for the fastener stringers which will permit the stringers to be completely separated from one another. Such complete separation of the fastener stringers is desirable in various articles, and particularly articles of clothing such as shirts, sweaters, coats and the like.

The general functions of the separable end connection are to hold together securely the ends of the fastener stringers by anchoring them against relative movement in all directions, and to position or aline the fastener elements on the opposite stringers so that they may be engaged in the proper order by the slider. As is common in such devices, one of the members of the connection provides a suitable stop for preventing removal of the slider from one of the stringers when the other stringer is disconnected therefrom.

An object of the present invention is to provide a simplified form of separable end connection for slide fasteners which may easily be manipulated and which possesses sufficient holding strength to provide a secure connection for the ends of the fastener stringers.

A more specific object is to provide an improved device of the type described, in which the members have cooperating projections, at least one of which is offset from the longitudinal face to engage and lock behind the other to prevent lateral separation, in combination with notches and projections or their equivalent in the longitudinal faces of the members to prevent transverse and longitudinal movement.

Other objects and advantages of the invention will more fully appear during the course of the following specification and the novel features will be defined in the appended claims.

In the accompanying drawings, I have shown for purposes of illustration one embodiment which my invention may assume in practice. In these drawings.

Figure 2:
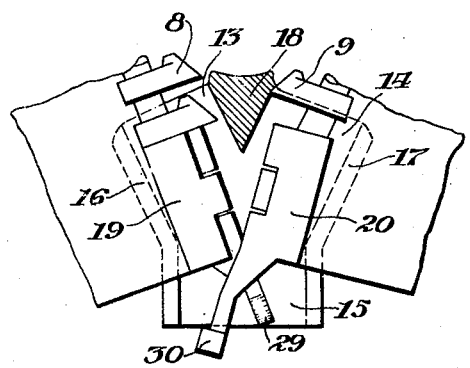
Fig. 2 is a view of the lower ends of the stringers, illustrating the manner of disconnecting my improved device.

The improved end connecting device of my invention is adaptable for use in connection with any of the known types of slide fasteners, the one illustrated comprising a pair of flexible stringers 6 and 7 having cooperating rows of fastener elements 8 and 9 respectively on their adjacent longitudinal edges. As is well understood in the art, these fastener elements are adapted to be progressively engaged or released simply by movement of a slider 10 having a suitable Y-shaped channel through which the fastener elements pass during interlocking or disengaging. The slider is actuated by a suitable pull member 11 attached to the body of the slider by a lug 12. In Fig. 2 the slider is shown in horizontal section and the Y-shaped channel is plainly seen. This channel has branches 13 and 14 diverging toward the rear end of the slider, which join with the single branch 15 at the forward end of the slider. The walls of this channel are defined by the side flanges 16 and 17 on the slider wings and the triangular shaped neck or wing connection 18.

The separable end connection comprises a pair of connecting members 19 and 20 which are provided with suitable clamping portions 21 and 22 respectively for securely attaching the members on the corded edges of the flexible stringers 6 and 7. The member 19 preferably abuts against the endmost fastener element 8 on its stringer while the member 20 is spaced sufficiently from the endmost element on its stringer to permit the opposite lower locking member to enter between the member 20 and the end fastener element. Suitable means is provided on the outer longitudinal faces of the connecting members to prevent relative longitudinal movement and relative transverse movement, that is, in a direction perpendicular to the plane of the stringers. For this purpose, the member 20 has the notches 23 which are about half the depth of the connecting member, and a projection 24 between the notches on one side of the member 20. The opposite side is provided with a notch 25 and the projecting portions 26 arranged in staggered relation with respect to the notches 23 and projection 24. The member 19 is formed with similar cooperating notches and projections to register with the notches and projections in the member 20. For example, the projecting portions or lugs 23a fit into the notches 23, the notch 24a receives the projection 24 and similarly the projection 25a fits into the notch 25 and the notches 26a on the member 19 receive the projections 26 on the member 20. It will, of course, be apparent that various arrangements of notches and projections may be devised which will accomplish the desired purpose.

Figure 1:
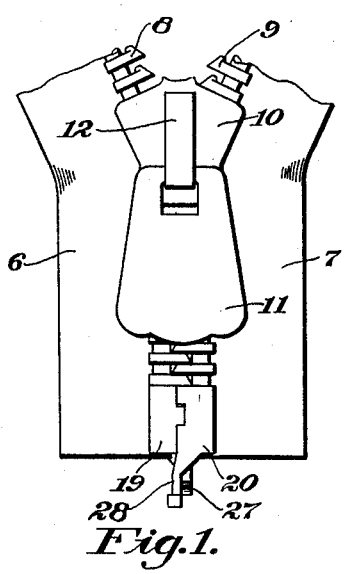
Fig. 1 is a plan view of a portion of a slide fastener having my invention associated therewith.
Figure 4:
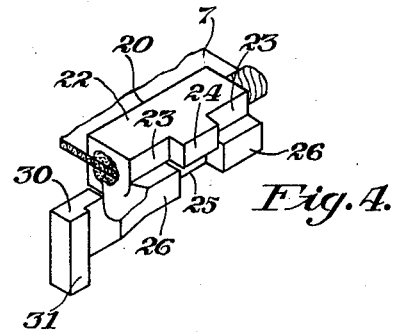
Fig. 4 is a perspective view of one of the connecting members.
Figure 5:
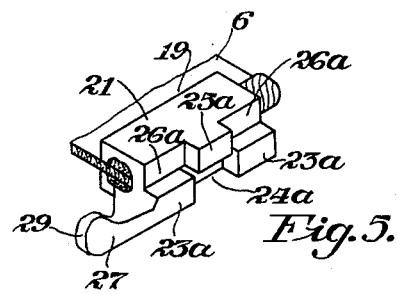
Fig. 5 is a perspective view of the cooperating connecting member.
Figure 6:
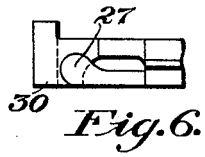
Fig. 6 is an edge view of the separable end connection.

Instead of the familiar form of male and female connection between the members, they are provided with longitudinal projections or arms designated 27 on the member 19, and 28 on the member 20. One or both of these projecting arms extends into laterally offset relation with respect to the longitudinal face of the members in order that they may overlap behind one another as clearly illustrated in Fig. 1, and prevent lateral separation. In other words, the arms overlap and cross each other. The projection 27 preferably has a head 29 with a rounded guiding surface and except in the head portion, is of only about half the thickness of the body portion of the connecting member. The projection 28 on the member 20 is also of only about half the thickness of the body part but positioned on the opposite side of the member so as to overlap with the projection 27 and permit its head portion 30 to engage behind and lock with the head 29. This projection 28 has also a lateral extension 31 which acts as a stop for the slider as shown in Fig. 2, to prevent removal of the slider from the stringer which carries the member 20, when the opposite stringer is separated therefrom.

Figure 3:
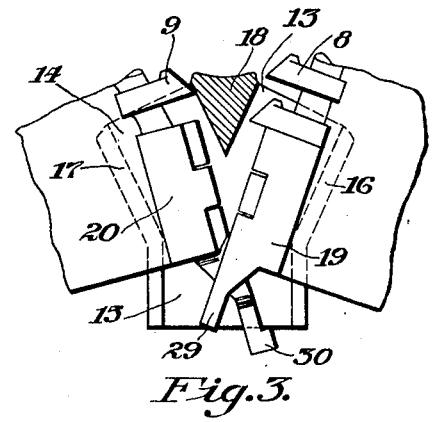
Fig. 3 is a view similar to Fig. 2 showing the opposite side of the connecting members.

The operation of my improved end connecting device will now be readily apparent in view of the foregoing description. Assuming that the fastener stringers are completely separated and it is desired to connect them together, the slider is positioned against the stop lug 31 and the operator catches hold of the stringer which carries the connecting member 19 with his thumb and finger and inserts it through the branch 13 of the slider channel. The round nose of the head 29 will guide the projection 27 over the projection 28 as illustrated in Figs. 2 and 3, until the body of the member 19 strikes against the member 20. The slider can now be pulled up and when the members 19 and 20 are brought into parallel relation, the heads 27 and 28 will lock behind each other and the cooperating notches and projections in the longitudinal faces will interengage so that the members are held effectively against separation in all directions.

If it is desired to disconnect the stringers, the slider is moved to the end carrying the connecting members, against the stop 31 and thereupon the members 19 and 20 will be spread apart at an angle to each other, as shown in Figs. 2 and 3. The stringer 6 with its member 19 can now be withdrawn from the slider.

As a result of my invention, it will be observed that a novel form of end connecting device for separable fasteners has been devised in which a pair of projecting arms engage behind each other instead of the threading of a pin or the like into a socket. The combination of the overlapping projecting heads and the interengaging notches and projections affords a secure but simple form of connection for the ends of the stringers.

While I have in this application specifically described one embodiment which my invention may assume in practice, it will be understood that this embodiment is merely for the purposes of illustration and description and that various other forms may be devised within the scope of my invention as defined in the appended claims.

What I claim as my invention is:

1. In a slide fastener, a pair of fastener stringers, cooperating rows of fastener elements attached to said stringers, a slider movable along said elements for engaging and releasing the same, and a separable end connection for said stringers at one end of said rows of elements comprising a connecting member on the end of one stringer having a projecting arm at its end, and a connecting member on the opposite stringer having a projecting arm at its end, cooperating means on the longitudinal faces of said members for preventing relative transverse and longitudinal movement in all directions, at least one of said arms having a laterally offset head for engagement behind the other of said arms to lock said members against lateral separation.

2. In a slide fastener, a pair of fastener stringers, cooperating rows of fastener elements attached to said stringers, a slider movable along said elements for engaging and releasing the same, and a separable end connection for said stringers at one end of said rows of elements comprising a connecting member on the end of one stringer having a projecting arm at its end, and a connecting member on the opposite stringer having a projecting arm at its end, said arms extending into overlapping and crossed relation, a head on one of said arms which locks behind the other arm to prevent lateral separation of said members, and cooperating means on said members to prevent relative transverse movement.

3. In a slide fastener, a pair of fastener stringers, cooperating rows of fastener elements attached to said stringers, a slider movable along said elements for engaging and releasing the same, and a separable end connection for said stringers at one end of said rows of elements comprising a connecting member on the end of one stringer having a projecting arm at its end, and a connecting member on the opposite stringer having a projecting arm at its end, cooperating notches and projections on the adjacent longitudinal faces of said members to prevent relative transverse and longitudinal separation, said arms overlapping and crossing each other, and a lug on one of said arms to engage behind a portion of the other of said arms to prevent lateral separation.

4. In a slide fastener, a pair of fastener stringers, cooperating rows of fastener elements attached to said stringers, a slider movable along said elements for engaging and releasing the same, and a separable end connection for said stringers at one end of said rows of elements comprising a connecting member on the end of one stringer having a longitudinally projecting arm at its end, and a connecting member on the opposite stringer having a projecting arm at its end, said arms overlapping and crossing each other, and interengaging heads on the ends of said arms which lock behind one another to prevent separation of said members.

In testimony whereof I affix my signature.

ERNEST M. WHITNEY.